J. F. ELLMAUERER.
DIRIGIBLE HEADLIGHT.
APPLICATION FILED MAR. 1, 1918.
1,298,314.
Patented Mar. 25, 1919.
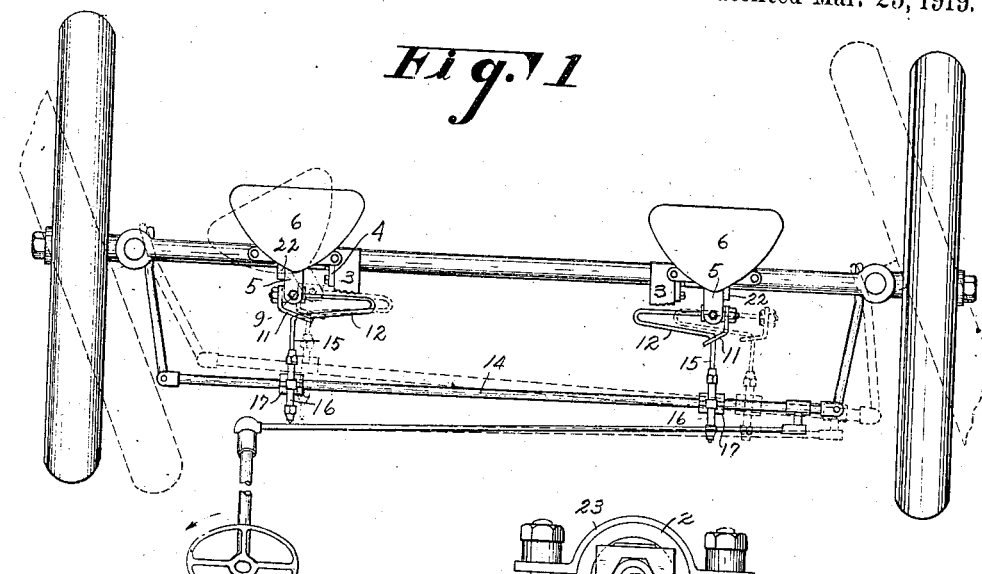
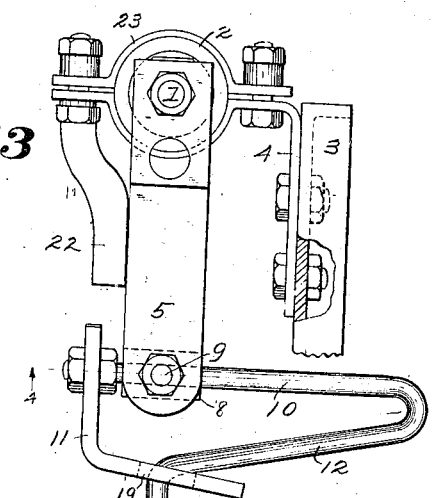
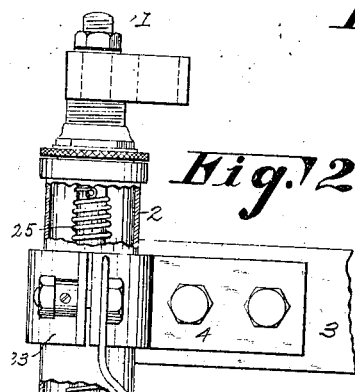
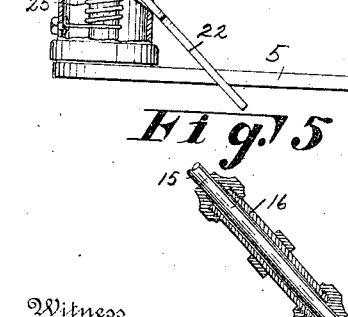
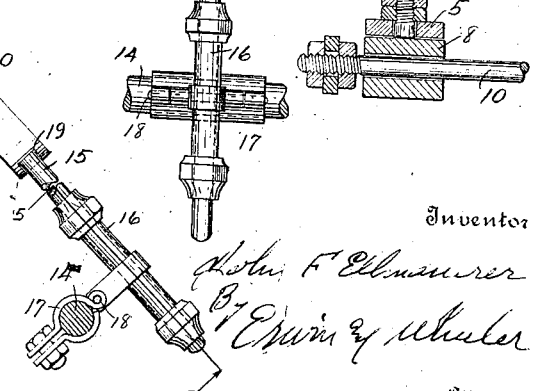

UNITED STATES PATENT OFFICE.

JOHN F. ELLMAUERER, OF FAIRCHILD, WISCONSIN.

DIRIGIBLE HEADLIGHT.

1,298,314.   Specification of Letters Patent.   Patented Mar. 25, 1919.

Application filed March 1, 1918. Serial No. 219,793.

*To all whom it may concern:*

Be it known that I, JOHN F. ELLMAUERER, a citizen of the United States, residing at Fairchild, county of Eau Claire, and State of Wisconsin, have invented new and useful Improvements in Dirigible Headlights, of which the following is a specification.

My invention relates to improvements in dirigible headlights for motor driven vehicles, and it pertains especially to that type of dirigible headlights disclosed in my former Patent #1,194,156, dated August 8, 1916.

The object of the present invention is to provide means whereby the headlights may be operated independently from the steering connections of the vehicle in such a manner that the left hand lamp will be turned to the left when the vehicle turns in that direction, the right hand lamp remaining in normal position, whereas when the vehicle turns to the right, the right hand lamp will also be turned to the right to light up the roadway along the turn, the left hand lamp remaining in normal position.

A further object of my invention is to provide a form of connection adapted for transmitting motion from the main cross bar of the steering connections to the respective lamp supporting standards in such a manner that the connections will not be subjected to strain or otherwise injuriously affected by the independent motion of the lamps and their supports due to the fact that they are mounted upon a spring supported vehicle frame, whereas the steering cross bar is carried by the sub-frame of the vehicle.

In the drawings:—

Figure 1 is a plan view of my invention as applied to a motor driven vehicle of ordinary type.

Fig. 2 is a fragmentary view in side elevation showing one of the lamp supporting standards and its connection with the cross bar of the steering mechanism.

Fig. 3 is a detail plan view, on an enlarged scale, of the lamp controlling connections.

Fig. 4 is a sectional view drawn on line 4—4 of Fig. 3.

Fig. 5 is a sectional view drawn on line 5—5 of Fig. 2.

Like parts are identified by the same reference characters throughout the several views.

The lamp supporting standard 1 and the tubular casing 2, in which the standard is journaled, may be assumed to be substantially the same as that disclosed in my former patent above referred to. The casing 2 is secured to the vehicle frame bar 3 by means of a bracket 4, and a lever 5 connected with the lower end of the standard is utilized to oscillate the standard for the purpose of turning the lamp 6 for the purpose of directing the rays of light to the side when the vehicle is turning a corner, whereby the roadway may be lighted up around the corner. All of the above mentioned parts may be assumed to be substantially the same in construction as those disclosed in my former patent, except that the lever 5 is connected with the source of power in a different manner and is operated differently as will now be described.

The upper end of the lever 5 is connected with a coupling member 8 by a vertically disposed pivot bolt 9 and the coupling 8 is transversely apertured to receive a rod 10 constituting part of a slide which preferably has the form of a clevis shaped yoke of which 11 and 12 are the respective legs. This yoke is connected with the steering cross bar 14 by a rod 15, sliding sleeve 16, and rod engaging clamp 17, the members of the clamp being secured to the sleeve by a transverse pivot rod 18. The rod 15 is rigidly connected with the yoke, and is preferably formed integrally with one of the legs of the yoke. It is formed of material which is slightly resilient and the other leg 11 of the yoke is preferably provided with a slot 19 through which the leg 12 passes at the elbow formed by its connection with the rod 15. This arrangement allows a slight yielding movement of the yoke under shock.

A stop arm 22 is adapted to serve as a stop. It is connected with a clamp 23 which also serves to secure the bracket 4 to the sleeve 2. The stop arm 22 limits the movement of lever 5 in one direction from the normal position, in which position the lamp is adapted to direct the rays of light directly forwardly from the front end of the vehicle.

For the left hand lamp, this stop arm 22 has its lower end at the left hand side of lever 5. A coiled spring 25, having one end connected with the casing 2 and the other end connected with the standard 1, is adapted to rotate the standard in a direction to carry lever 5 against, and hold it in contact with, this stop arm 22 under normal conditions. The arrangement is reversed for the right hand lamp, the stop arm 22 being located at the right of the lever 5 and the spring 25 being arranged to hold the lever 5 normally in contact with the stop arm.

Under normal conditions, rod 10 of the left hand coupling yoke will be pushed through coupling member 8 to the limit of its movement in the right hand direction. Rod 10 of the right hand yoke will be pushed through the coupling member 8 to the limit of its movement in the left hand direction. Therefore, if the vehicle is turned to the left, motion will be transmitted from the steering cross bar 14 to swing the left hand lamp to the left, for the reason that, when the steering cross bar is actuated for such a turn, it is moved to the right, carrying with it, both coupling yokes, but the left hand yoke being already at the limit of its right hand movement in coupling member 8 will transmit motion to said coupling member 8 and through the latter to the left hand lever 5, thereby oscillating the associated lamp to the left. The right hand yoke rod 10 will, however, move freely to the bight in its associated coupling member 8, transmitting no motion to the right hand lever 5 and the latter is prevented from moving to the right by its associated stop arm 22.

When the steering cross bar 14 is actuated in the opposite direction to turn the vehicle to the right, the right hand lamp will, in a similar manner, be oscillated to the right without affecting the left hand lamp.

It will be observed that the coupling yokes are in flexible motion transmitting connection with the lamps 5 owing to the fact that the rods 10 are adapted to oscillate in their respective coupling members 8 and the coupling members are adapted to oscillate about a vertical axis, for the reason that they are connected with their respective levers 5 by the vertically disposed pivot bolts 9. It will also be observed that the sleeve 16 is adapted to slide upon the rod 15. The steering cross bar 14 is located a substantially distance below the plane in which the levers 5 are located, the latter being supported by the spring supported main frame of the vehicle represented by the frame bars 3, whereas the steering cross bar 14 is carried by the sub-frame. Owing to the fact that the rod 15 thus occupies an inclined position, it is adapted to slide upwardly and downwardly in the sleeve 16 in correspondence with the action of the springs which support the main frame of the vehicle. Each of the sleeves 16 is also adapted to oscillate upon its associated rod 15, and the clamps 17 being adapted to oscillate upon their connecting pivot pins 18, it is obvious that each rod 15 is in flexible motion transmitting connection with the cross bar 14. These flexible joint connections taken with the sliding connections afforded by loosely mounting the sleeves 16 upon the rods 15 relieve the lamp standards from all strains and shocks which would otherwise be transmitted to them from the sub-frame and still enables me to transmit the desired movements to the standards when the vehicle is being driven along curved lines of travel.

I attach great importance to the provision of means whereby only one lamp is oscillated automatically from the steering connections of the vehicle during any given turning operation, for I am thereby enabled to light up the roadway directly in advance of the vehicle and simultaneously light up the roadway around or across the corner.

Another important feature of my invention is to be found in the means for actuating the rod 15 with the steering cross bar 14 while maintaining rod 15 in a position at right angles to the cross bar and still allowing said rod to swing about the pivot rod 18 as an axis, to slide in the sleeve 16, and to also oscillate about its own axis, or allowing sleeve 16 to oscillate about such axis.

Owing to the fact that the pivot rod 15 is located in the sleeve barrel and the latter extends transversely across the line of the pivot rod 18, the sleeve is permitted to oscillate above the steering cross bar while moving with the cross bar when the latter is actuated longitudinally. The sleeve is of sufficient length to carry the rod 15 bodily without cramping in any manner and therefore these bodily movements do not interfere with the sliding movements of the rod in the sleeve. The sliding movements of the yokes are at right angles to the sliding movements of the rods 15 in their supporting sleeves and parallel with the cross bar, but owing to the fact that the coupling member 8 is permitted to oscillate about the axis of its vertically disposed pivot bolt 9, no cramping effects result from the fact that the lever 5 swings about the axis of the lamp standard and the increased distance is compensated for by the sliding of rod 15 in sleeve 16. Similarly, the vertical movement of the vehicle frame is allowed to take place without developing either cramping or tension strains, for the reason that the yoke oscillates about a horizontal axis in the coupling member 8 and the sliding movement of rod 15 allows for variations in the distance between this coupling member and the steering cross bar.

I claim:—

1. In a vehicle provided with a steering cross bar operatively connected with the steering wheel, the combination of a set of lamp supporting vertically disposed standards, each having a rearwardly projecting arm adapted to oscillate about their vertical axes, a coupling block connected with each of said arms, and also adapted to oscillate about a vertical axis, slides connected with the respective coupling blocks, and adapted for limited sliding movements therein along lines parallel with the cross bar, each of said slides being normally positioned at the inner end of its field of movement in the block, and an extensible shank connecting each of the slides with the cross bar,—said cross bar having sleeves in which the shanks are journaled, and adapted to oscillate about an axis transverse to the cross bar.

2. In a vehicle provided with a steering cross bar, the combination of a vertically disposed oscillatory lamp supporting standard provided with an actuating lever, a coupling block mounted upon said lever, and adapted to oscillate thereon about a vertical axis, a slide operatively connected with the coupling block, and adapted for limited movement along a line parallel to the cross bar, said slide being normally disposed with its outer end adjacent to the coupling block, and adapted to move in the block outwardly toward the side of the wheel, and to oscillate therein about its own axis, said slide having a rearwardly extending extensible shank projecting across the steering cross bar, and said cross bar having a sleeve transversely mounted thereon, and in which the shank is journaled for oscillatory movement about its own axis.

3. In a vehicle provided with steering mechanism, including a laterally shifting cross bar, the combination of a set of lamp supporting standards adapted to oscillate about vertical axes independently of each other, resilient means for normally holding the standards in one position of adjustment, and independently operating connections between the steering cross bar and the standards, each including a transversely sliding yoke having an arm extending longitudinally of the vehicle, in sliding and also oscillatory connection with said steering cross bar, said yoke being adapted for bodily movement with the steering cross bar transversely of the vehicle, and said lamp standards having connections articulated for both oscillatory and sliding movements upon the yoke, and adapted to allow universal vibratory movements of the steering mechanism without transmission thereof to the associated lamp supporting standard, while utilizing transverse yoke movements of definite length to oscillate the lamp standard in one direction about a vertical axis.

4. In a vehicle provided with a transversely disposed steering cross bar, the combination of a set of lamp supporting standards, adapted to oscillate about vertical axes independently of each other, resilient means for normally holding the standards in one position of adjustment, and sets of universally jointed connections between said steering cross bar and the respective standards, each of said connections being adapted to extend and contract longitudinally of the vehicle, without affecting the head-lights, and each of said connections also including a member connected for transverse movements with the steering cross bar, and adapted to transfer corresponding oscillatory movements to the associated lamp supporting standard after limited independent movement with the cross bar.

In testimony whereof I affix my signature in the presence of two witnesses.

JOHN F. ELLMAUERER.

Witnesses:
O. C. WEBER,
FREDERICK W. NOLTE.